(12) United States Patent
Matsuda et al.

(10) Patent No.: US 12,460,845 B2
(45) Date of Patent: Nov. 4, 2025

(54) COLD PLATE

(71) Applicant: Fujikura Ltd., Tokyo (JP)

(72) Inventors: Masahiro Matsuda, Tokyo (JP); Yoji Kawahara, Tokyo (JP)

(73) Assignee: Fujikura Ltd., Tokyo (JP)

( * ) Notice: Subject to any disclaimer, the term of this patent is extended or adjusted under 35 U.S.C. 154(b) by 93 days.

(21) Appl. No.: 18/439,990

(22) Filed: Feb. 13, 2024

(65) Prior Publication Data

US 2024/0271841 A1    Aug. 15, 2024

(30) Foreign Application Priority Data

Feb. 14, 2023 (JP) ................................ 2023-020625

(51) Int. Cl.
*F25B 41/48* (2021.01)
*F25B 39/02* (2006.01)
*F28F 7/02* (2006.01)

(52) U.S. Cl.
CPC ............ *F25B 41/48* (2021.01); *F25B 39/022* (2013.01); *F28F 7/02* (2013.01); *F28F 2215/00* (2013.01); *F28F 2250/108* (2013.01)

(58) Field of Classification Search
CPC . F25B 41/48; F25B 39/022; F28F 7/02; F28F 2215/00; F28F 2250/108; F28D 1/0333
See application file for complete search history.

(56) References Cited

U.S. PATENT DOCUMENTS

| | | | | |
|---|---|---|---|---|
| 2006/0090886 | A1* | 5/2006 | Kamiyama | B60H 1/0055 165/170 |
| 2011/0232882 | A1* | 9/2011 | Zaffetti | F28F 3/12 165/168 |
| 2020/0296858 | A1* | 9/2020 | Matsumura | H01L 23/473 |

FOREIGN PATENT DOCUMENTS

JP    2022-69115 A    5/2022

* cited by examiner

*Primary Examiner* — Joseph F Trpisovsky
(74) *Attorney, Agent, or Firm* — Osha Bergman Watanabe & Burton LLP

(57) ABSTRACT

A cold plate includes a main body in contact with a heat source. The main body has: an inflow hole through which a refrigerant flows in; an outflow hole through which the refrigerant flows out; and an internal space communicating with the inflow hole and the outflow hole and through which the refrigerant flows, and includes: a first heat exchange layer in the internal space; and a second heat exchange layer in the internal space. The first heat exchange layer and the second heat exchange layer are laminated in a thickness direction of the first heat exchange layer and of the second heat exchange layer.

8 Claims, 8 Drawing Sheets

COLD PLATE

Priority is claimed on Japanese Patent Application No. 2023-020625 filed on Feb. 14, 2023, the content of which is incorporated herein by reference.

TECHNICAL FIELD

The present invention relates to a cold plate.

BACKGROUND

Conventionally, a cold plate including a metal plate having a plurality of fins arranged parallel to each other and a cover covering the plurality of fins is known (for example, see Patent Document 1).

PATENT LITERATURE

[Patent Document 1] Japanese Unexamined Patent Application, First Publication No. 2022-69115

Due to an increase in heat generation density according to high integration of electronic components in recent years, higher cooling performance in cold plates is required. In a cold plate having a structure in which a plurality of fins are arranged parallel to each other (for example, see Patent Document 1), a method of improving cooling performance by making the fins thinner and reducing a distance between the fins is generally known.

However, there is a manufacturing limit to making the fins thinner. Also, reducing a distance between the fins may cause an increase in pressure loss or the like, and this may hinder improvement in cooling performance. Therefore, with the conventional cold plate as described above, there have been cases in which it is not possible to satisfy the cooling performance required when it is used for components that generate a very high amount of heat (for example, CPUs, GPUs, or the like for supercomputers or mainframes).

SUMMARY

The present invention has been made in consideration of such circumstances, and one or more embodiments of the present invention provide a cold plate with improved cooling performance.

A cold plate according to one or more embodiments of the present invention includes a main body part in contact with a heat source, in which the main body part has an inflow hole through which a refrigerant flows in, an outflow hole through which the refrigerant flows out, an internal space communicating with the inflow hole and the outflow hole and through which the refrigerant flows, and a layer-shaped first heat exchange part and second heat exchange part disposed in the internal space and laminated in a thickness direction, the first heat exchange part has a first flow path through which the refrigerant flows in a first direction, and a second flow path through which the refrigerant flows in the first direction and disposed at a position different from the first flow path in a second direction intersecting the first direction, and the second heat exchange part has a cross flow path disposed in the internal space and communicating with the first flow path and the second flow path so that the refrigerant flows therethrough in the second direction.

According to the above-described embodiments of the present invention, in the process in which the refrigerant flows from the inflow hole to the outflow hole, the refrigerant moves between the first flow path and the second flow path through the cross flow path. Thereby, it is possible to increase a thermal contact area (heat transfer area) between the refrigerant and the main body part compared to a conventional cold plate in which, for example, a plurality of fins are arranged parallel to each other and a flow path extends linearly. Therefore, it is possible to improve a cooling efficiency of the cold plate.

Also, according to one or more embodiments of the present invention, in the cold plate, the second heat exchange part may include a plurality of the cross flow paths having different positions from each other in the first direction.

Also, according to one or more embodiments of the present invention, in the cold plate, an outlet blocking portion restricting a flow of the refrigerant in the first direction may be provided at an end portion of both end portions of the first flow path close to the outflow hole in the first direction.

Also, according to one or more embodiments of the present invention, in the cold plate, the cross flow path may communicate with a portion of the first flow path adjacent to the outlet blocking portion.

Also, according to one or more embodiments of the present invention, in the cold plate, the second heat exchange part may include the plurality of cross flow paths having different positions from each other in the first direction, a first intermediate blocking portion restricting a flow of the refrigerant in the first direction may be provided at a portion of the first flow path other than both end portions in the first direction, a second intermediate blocking portion restricting a flow of the refrigerant in the first direction may be provided at a portion of the second flow path other than both end portions in the first direction, and the second intermediate blocking portion may be positioned between the outlet blocking portion and the first intermediate blocking portion in the first direction.

Also, according to one or more embodiments of the present invention, in the cold plate, an inlet blocking portion restricting a flow of the refrigerant in the first direction may be provided at an end portion of both end portions of the second flow path close to the inflow hole in the first direction.

Also, according to one or more embodiments of the present invention, in the cold plate, the main body part may include a plurality of the first heat exchange parts and a plurality of the second heat exchange parts which are alternately laminated in the thickness direction.

Also, in the cold plate, one or more embodiments of the present invention may further include a restriction portion restricting a range in which the refrigerant is movable in the thickness direction at a portion in which the first flow path and the second flow path intersect the cross flow path when viewed from the thickness direction.

According to the above-described embodiments of the present invention, it is possible to provide a cold plate with improved cooling performance.

DETAILED DESCRIPTION

First Embodiment

Hereinafter, a cold plate according to a first embodiment of the present invention will be described on the basis of the drawings.

Figure 1:
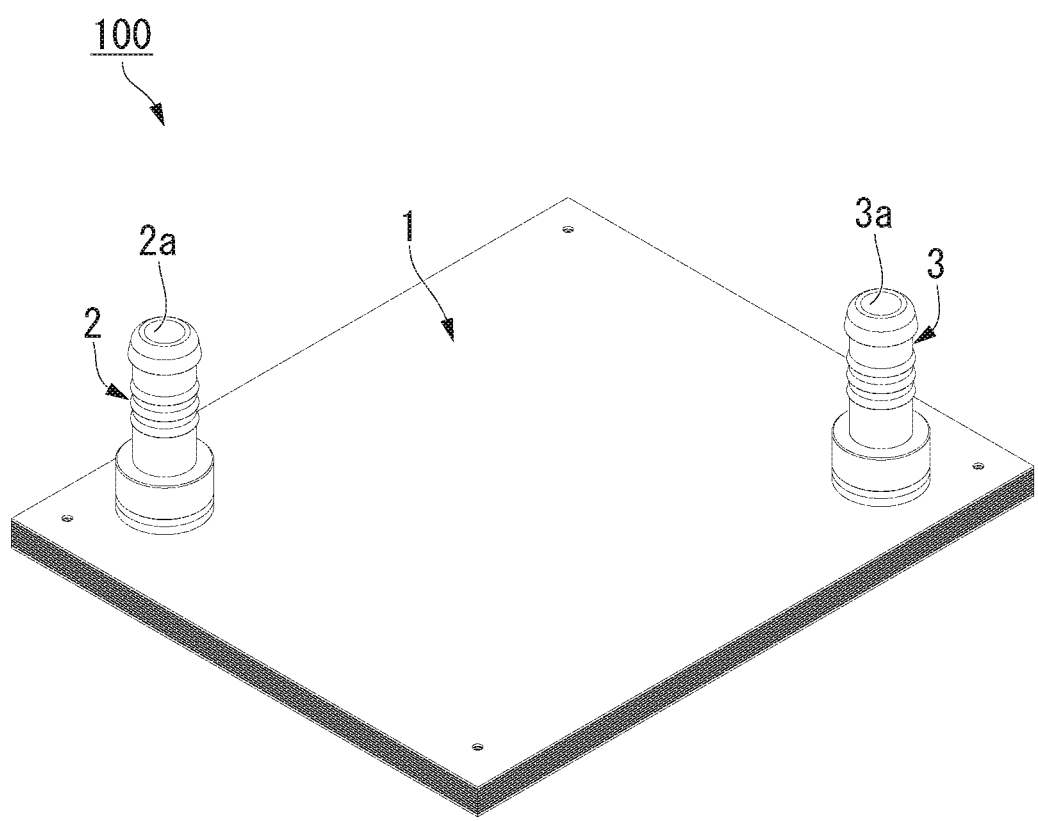
FIG. 1 is a perspective view illustrating a cold plate according to a first embodiment of the present invention.
Figure 1:
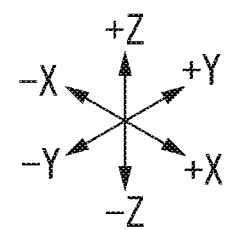

As illustrated in FIG. 1, a cold plate 100 according to the present embodiment may include a main body part (i.e., main body) 1, an inlet connection part 2, and an outlet connection part 3. The inlet connection part 2 is a cylindrical member having a supply hole 2a. For example, an inlet pipe (not illustrated) for supplying a refrigerant is connected to the inlet connection part 2. The outlet connection part 3 is a cylindrical member having a discharge hole 3a. For example, an outlet pipe (not illustrated) for discharging the refrigerant is connected to the outlet connection part 3.

Figure 2:
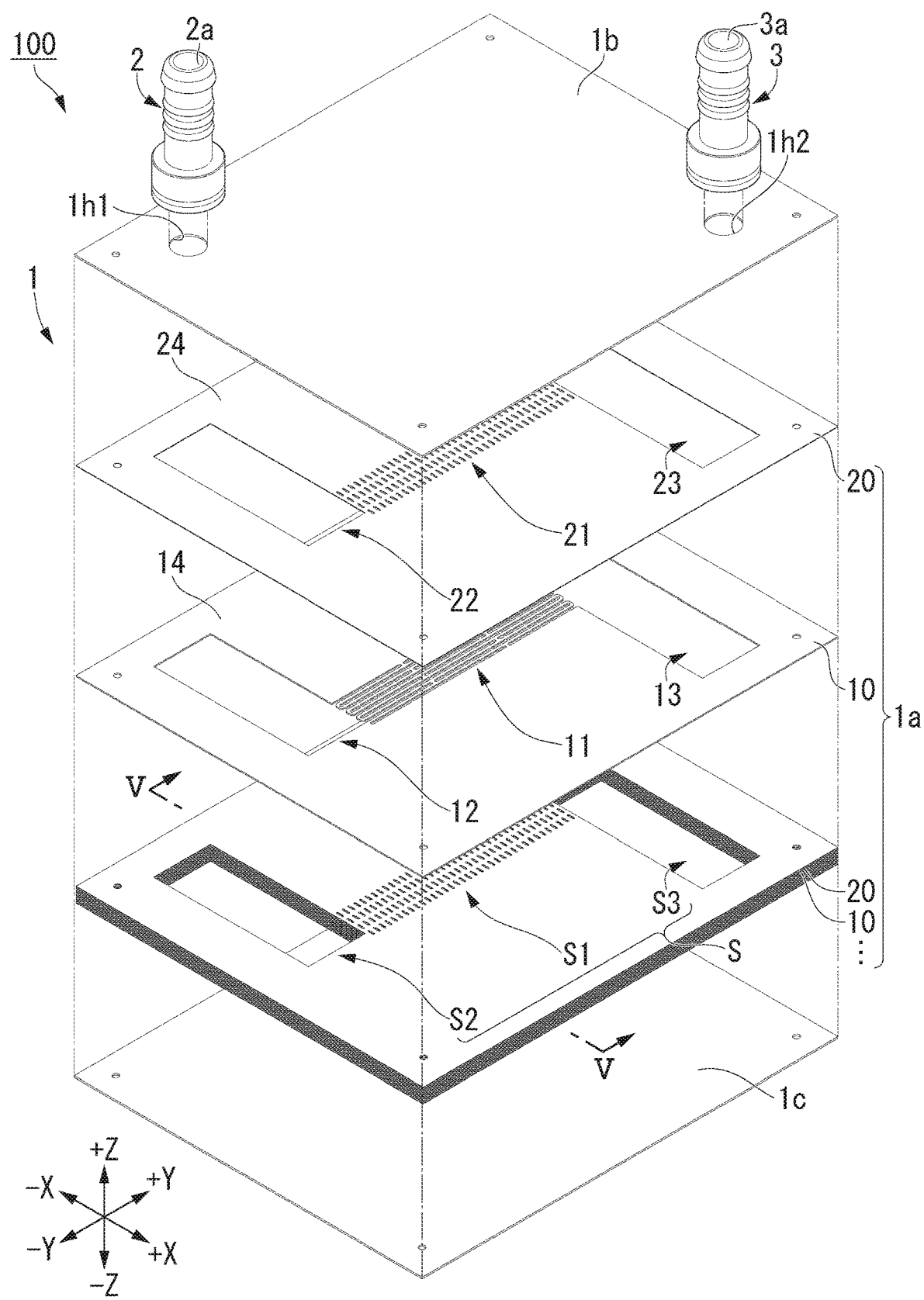
FIG. 2 is an exploded view illustrating the cold plate according to the first embodiment of the present invention.

As illustrated in FIG. 2, the main body part 1 includes a laminated part 1a, a top plate part 1b, and a bottom plate part 1c. The laminated part 1a is disposed between the top plate part 1b and the bottom plate part 1c. That is, the main body part 1 according to the present embodiment may have a structure in which the bottom plate part 1c, the laminated part 1a, and the top plate part 1b are laminated in this order.

The laminated part 1a has a structure in which a plurality of first plates 10 and a plurality of second plates 20 are alternately laminated. The first plates 10, the second plates 20, the top plate part 1b, and the bottom plate part 1c according to the present embodiment may be rectangular layer-shaped members having substantially the same outer shape as each other in a plan view. Note that, the phrase "substantially the same" also includes a case in which it may be regarded as the same if a manufacturing error is removed. Thicknesses of the first plate 10 and the second plate 20 are each, for example, about 0.2 mm.

The first plates 10, the second plates 20, the top plate part 1b, and the bottom plate part 1c are joined to each other by, for example, diffusion joining. However, a method of fixing the first plates 10, the second plates 20, the top plate part 1b, and the bottom plate part 1c to each other is not limited to diffusion joining, and may be changed as appropriate.

Figure 3:
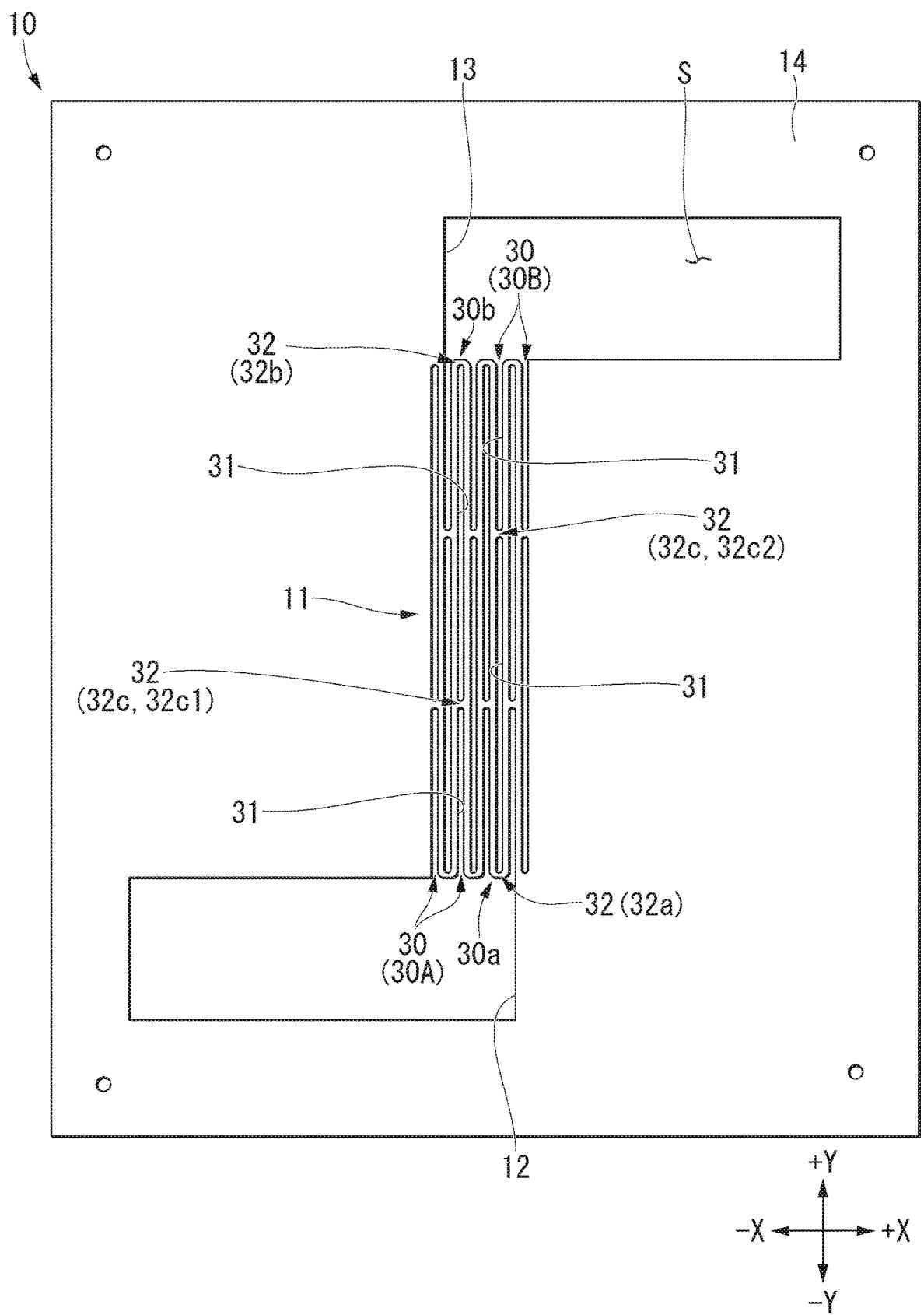
FIG. 3 is a plan view illustrating a first plate according to the first embodiment of the present invention.

A layer-shaped first heat exchange part 11 (i.e., first heat exchange layer) having a plurality of parallel flow paths 30 (first flow paths 30A and second flow paths 30B) is provided at a central portion of the first plate 10 (see also FIG. 3). A layer-shaped second heat exchange part 21 (i.e., second heat exchange layer) having a plurality of cross flow paths 40 is provided at a central portion of the second plate 20 (see also FIG. 4). In the present embodiment, the first heat exchange part 11 may be a portion of the first plate 10, and the second heat exchange part 21 may be a portion of the second plate 20. The plurality of first heat exchange parts 11 and the plurality of second heat exchange parts 21 are alternately laminated by alternately laminating the plurality of first plates 10 and the plurality of second plates 20.

Definition of Directions

In the present embodiment, a thickness direction of the first heat exchange part 11 (the first plate 10) and the second heat exchange part 21 (the second plate 20) may be simply referred to as a thickness direction Z. The thickness direction Z is also a direction in which the first heat exchange part 11 (the first plate 10) and the second heat exchange part 21 (the second plate 20) are laminated. A view from the thickness direction Z is referred to as a plan view. Also, one direction intersecting (for example, orthogonal to) the thickness direction Z is referred to as a first direction Y. Also, a direction intersecting (for example, orthogonal to) both the thickness direction Z and the first direction Y is referred to as a second direction X. Also, one direction in the thickness direction Z is referred to as a +Z direction or upward. In the present embodiment, the "+Z direction" may also be a direction from the bottom plate part 1c toward the laminated part 1a. A direction opposite to +Z direction is referred to as a −Z direction or downward. Also, one direction in the first direction Y is referred to as a +Y direction or an outlet side. A direction opposite to the +Y direction is referred to as a −Y direction or an inlet side. Also, one direction in the second direction X is referred to as a +X direction or rightward. A direction opposite to the +X direction is referred to as a −X direction or leftward.

The first plate 10, the second plate 20, the top plate part 1b, and the bottom plate part 1c may be formed of a material having satisfactory thermal conductivity. As a material of the first plate 10, the second plate 20, the top plate part 1b, and the bottom plate part 1c, a metal such as copper, a copper alloy, aluminum, or an aluminum alloy may be used.

As illustrated in FIG. 2, the first plate 10 according to the present embodiment may include the first heat exchange part 11, a branch hole 12, a joining hole 13, and a frame part 14. A shape of the frame part 14 according to the present embodiment may be a rectangular annular shape. The first heat exchange part 11, the branch hole 12, and the joining hole 13 are formed inside the frame part 14 in a plan view. The branch hole 12 and the joining hole 13 each penetrate the first plate 10 in the thickness direction Z. Also, the second plate 20 according to the present embodiment may include the second heat exchange part 21, a branch hole 22, a joining hole 23, and a frame part 24. A shape of the frame part 24 according to the present embodiment may be a rectangular annular shape. The second heat exchange part 21, the branch hole 22, and the joining hole 23 are formed inside the frame part 24 in a plan view. The branch hole 22 and the joining hole 23 each penetrate the second plate 20 in the thickness direction Z.

The first plate 10 as described above may be manufactured by, for example, subjecting a thin plate-shaped member to etching processing to form the first heat exchange part 11 (the plurality of parallel flow paths 30), the branch hole 12, and the joining hole 13. Similarly, the second plate 20 may be manufactured by, for example, subjecting a thin plate-shaped member to etching processing to form the second heat exchange part 21 (the plurality of cross flow paths 40), the branch hole 22, and the joining hole 23.

An inflow hole 1h1 and an outflow hole 1h2 may be formed in the top plate part 1b according to the present embodiment. The inflow hole 1h1 and the outflow hole 1h2 each penetrate the top plate part 1b in the thickness direction Z. The inlet connection part 2 is connected to the main body part 1 so that the supply hole 2a and the inflow hole 1h1 communicate with each other. The outlet connection part 3 is connected to the main body part 1 so that the discharge hole 3a and the outflow hole 1h2 communicate with each other.

The main body part 1 has an internal space S that communicates with the inflow hole 1h1 and the outflow hole 1h2. In the present embodiment, the internal space S of the main body part 1 may be a space surrounded by the top plate part 1b, the bottom plate part 1c, and a plurality of frame parts 14 and 24. The first heat exchange part 11 and the second heat exchange part 21 are disposed in the internal space S.

Also, the internal space S according to the present embodiment may be subdivided into a heat exchange portion S1, a branching portion S2, and a joining portion S3. The branching portion S2 is a space formed by laminating a plurality of branch holes 12 and 22 in the thickness direction Z. The branching portion S2 communicates with the inflow hole 1h1. The joining portion S3 is a space formed by laminating a plurality of joining holes 13 and 23 in the thickness direction Z. The joining portion S3 communicates with the outflow hole 1h2. In the illustrated example, the inflow hole 1h1 and the outflow hole 1h2 are provided at two corner portions positioned on a diagonal line of the top plate part 1b, but positions of the inflow hole 1h1 and the outflow hole 1h2 are not limited thereto. Positions of the inflow hole 1h1 and the outflow hole 1h2 may be changed as appropriate as long as the inflow hole 1h1 communicates with the branching portion S2 and the outflow hole 1h2 communicates with the joining portion S3.

The heat exchange portion S1 is a portion formed by laminating the plurality of first heat exchange parts 11 and the plurality of second heat exchange parts 21 alternately in the thickness direction Z. The heat exchange portion S1 is positioned at a central portion of the internal space S in a plan view. The branching portion S2, the heat exchange portion S1, and the joining portion S3 are arranged in this order from the inlet side (−Y side) to the outlet side (+Y side).

The cold plate 100 functions as a heat dissipation module that receives heat from a heat source or a heat transfer member (for example, a heat transfer plate) in contact with the main body part 1 (for example, the bottom plate part 1c) and releases the received heat to the outside. The refrigerant that has supplied from the supply hole 2a flows into the branching portion S2 of the internal space S through the inflow hole 1h1. The refrigerant that has flowed into the branching portion S2 reaches the joining portion S3 through the plurality of parallel flow paths 30 and the plurality of cross flow paths 40 (see also FIGS. 3 and 4) of the heat exchange portion S1. At this time, the refrigerant absorbs heat from the heat source via the first plates 10 and the second plate 20. The refrigerant that has absorbed the heat is discharged to the discharge hole 3a through the discharge hole 1h2, and is discharged to the outside of the cold plate 100. Through the process described above, it is possible for the cold plate 100 to receive heat from the heat source and release the received heat to the outside.

Hereinafter, detailed structures of the parallel flow paths 30 and the cross flow paths 40 will be described. As described above, the parallel flow paths 30 are formed in the first heat exchange part 11, and the cross flow paths 40 are formed in the second heat exchange part 21.

As illustrated in FIG. 3, the first heat exchange part 11 has the plurality of parallel flow paths 30 whose positions in the second direction X are different from each other. The parallel flow paths 30 each extend from the branch hole 12 to the joining hole 13, and the refrigerant flows in the first direction Y. Hereinafter, an end portion of both end portions of the parallel flow path 30 close to the inflow hole 1h1 (the branch hole 12) will be referred to as an inlet end 30a, and an end portion of both end portions of the parallel flow path 30 close to the outflow hole 1h2 (the joining hole 13) will be referred to as an outlet end 30b (see also FIG. 2). That is, the inlet end 30a is an end portion of the parallel flow path 30 on the inlet side (−Y side), and the outlet end 30b is an end portion of the parallel flow path 30 on the outlet side (+Y side).

As illustrated in FIG. 3, the parallel flow paths 30 according to the present embodiment may each include two flow holes 31 and two blocking portions 32. Each of the flow holes 31 is a hole that extends in the first direction Y and allows the refrigerant to flow in the first direction Y. Each of the flow holes 31 according to the present embodiment may penetrate the first heat exchange part 11 in the thickness direction Z. Each of the blocking portions 32 is a portion that blocks the flow hole 31 and restricts a flow of the refrigerant in the first direction Y. The first heat exchange part 11 having such parallel flow paths 30 may be manufactured by, for example, subjecting a layer-shaped member to etching processing for only portions to be the flow holes 31, and not subjecting it to etching processing for portions to be the blocking portions 32.

Here, the plurality of parallel flow paths 30 according to the present embodiment may include the plurality of first flow paths 30A and the plurality of second flow paths 30B. The second flow paths 30B are disposed at positions different from the first flow paths 30A in the second direction X. More specifically, in the first heat exchange part 11 according to the present embodiment, the plurality of first flow paths 30A and the plurality of second flow paths 30B may be alternately disposed in the second direction X.

The first flow paths 30A and the second flow paths 30B are different in positions at which the blocking portion 32 is provided. That is, in the first flow path 30A, one of the blocking portions 32 is provided at each of the outlet end 30b and a portion other than both end portions in the first direction Y (an intermediate point in the first direction Y). On the other hand, in the second flow path 30B, one of the blocking portions 32 is provided at each of the inlet end 30a and a portion other than both end portions in the first direction Y (an intermediate point in the first direction Y).

Hereinafter, the blocking portion 32 provided at the inlet end 30a of the parallel flow path 30 will be referred to as an inlet blocking portion 32a, and the blocking portion 32 provided at the outlet end 30b of the parallel flow path 30 will be referred to as an outlet blocking portion 32b. Also, the blocking portion 32 provided at a portion of the parallel flow path 30 other than both end portions (the inlet end 30a and the outlet end 30b) will be referred to as an intermediate blocking portion 32c. Further, the intermediate blocking portion 32c provided in the first flow path 30A will be referred to as a first intermediate blocking portion 32c1, and the intermediate blocking portion 32c provided in the second flow path 30B will be referred to as a second intermediate blocking portion 32c2. In the present embodiment, the outlet blocking portion 32b and the first intermediate blocking portion 32c1 may be provided in the first flow path 30A, and the inlet blocking portion 32a and the second intermediate blocking portion 32c2 may be provided in the second flow path 30B.

Also, the inlet blocking portion 32a may not be provided in the first flow path 30A according to the present embodiment. That is, the first flow path 30A according to the present embodiment may open to the branch hole 12 and may communicate with the inflow hole 1h1 (see also FIG. 2). Then, the outlet blocking portion 32b may not be provided in the second flow path 30B according to the present embodiment. That is, the second flow path 30B according to the present embodiment may open to the joining hole 13 and may communicate with the outflow hole 1h2 (see also FIG. 2).

Figure 4:
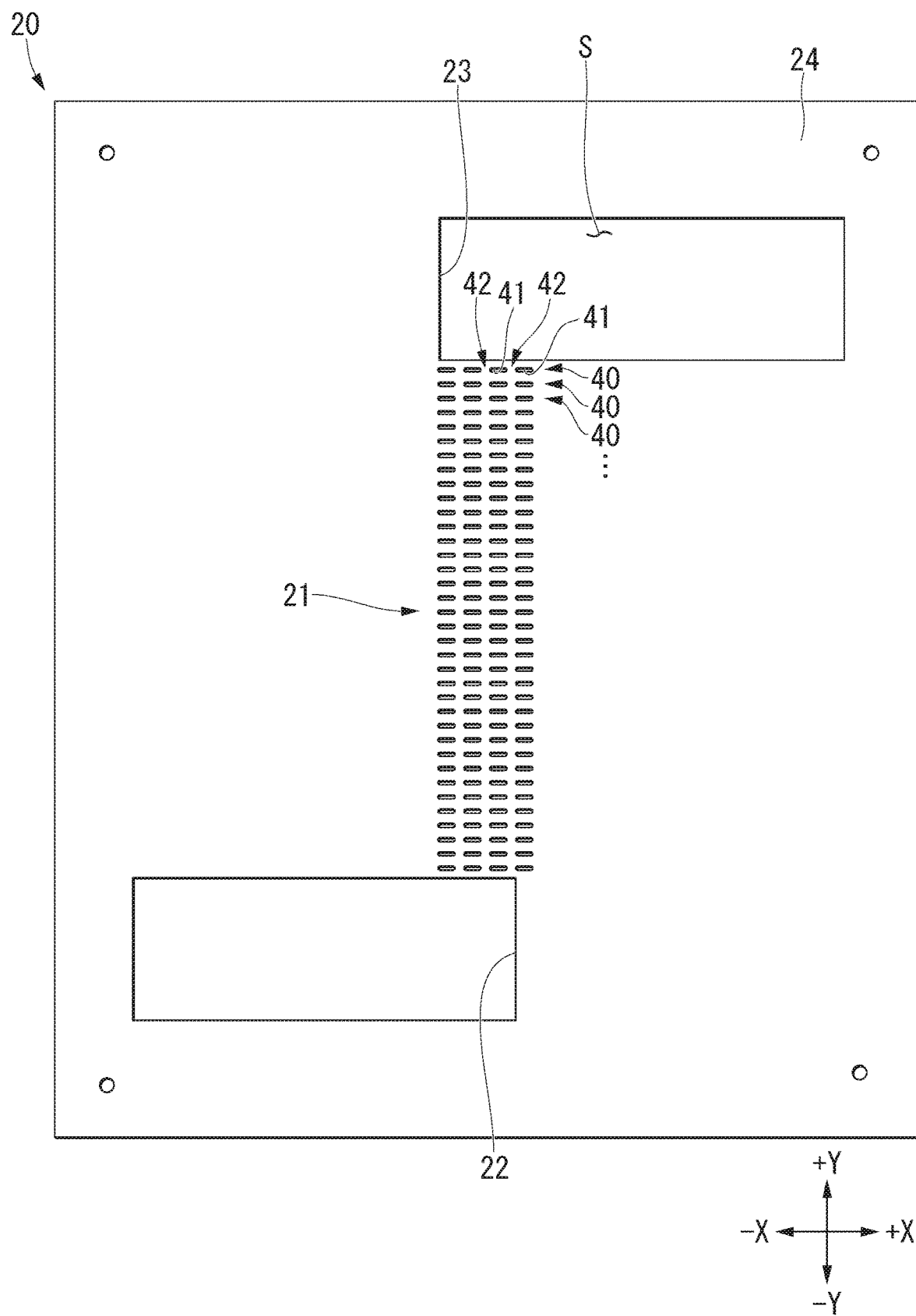
FIG. 4 is a plan view illustrating a second plate according to the first embodiment of the present invention.

As illustrated in FIG. 4, the second heat exchange part 21 according to the present embodiment may include the plurality of cross flow paths 40 whose positions in the first direction Y are different from each other. The refrigerant flows through the cross flow paths 40 in the second direction X.

Specifically, each of the cross flow paths 40 includes a plurality of connection holes 41 and a plurality of non-connection portions 42 disposed alternately in the second direction X. Each of the connection holes 41 is a hole extending in the second direction X, and allows the refrigerant to flow in the second direction X. The connection holes 41 according to the present embodiment may each penetrate the second heat exchange part 21 in the thickness direction Z. Each of the non-connection portions 42 is a portion that blocks the connection hole 41 and restricts a flow of the refrigerant in the second direction X. The second heat exchange part 21 having such cross flow paths 40 may be manufactured by, for example, subjecting a layer-shaped member to etching processing for only portions to be the connection holes 41, and not subjecting it to etching processing for portions to be the non-connection portions 42.

Figure 5:
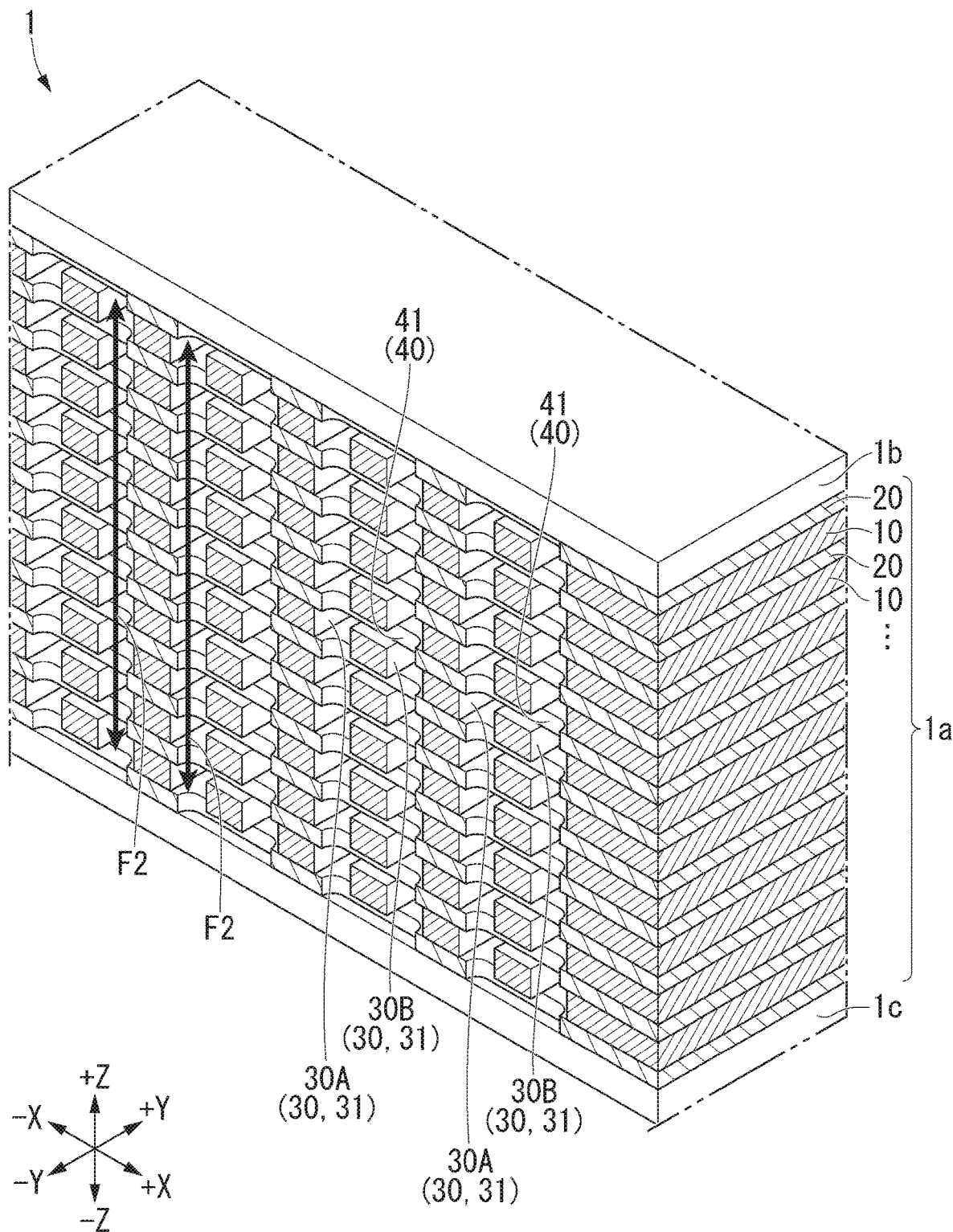
FIG. 5 is a perspective view illustrating a cross section taken along line V-V in FIG. 2.
Figure 6:
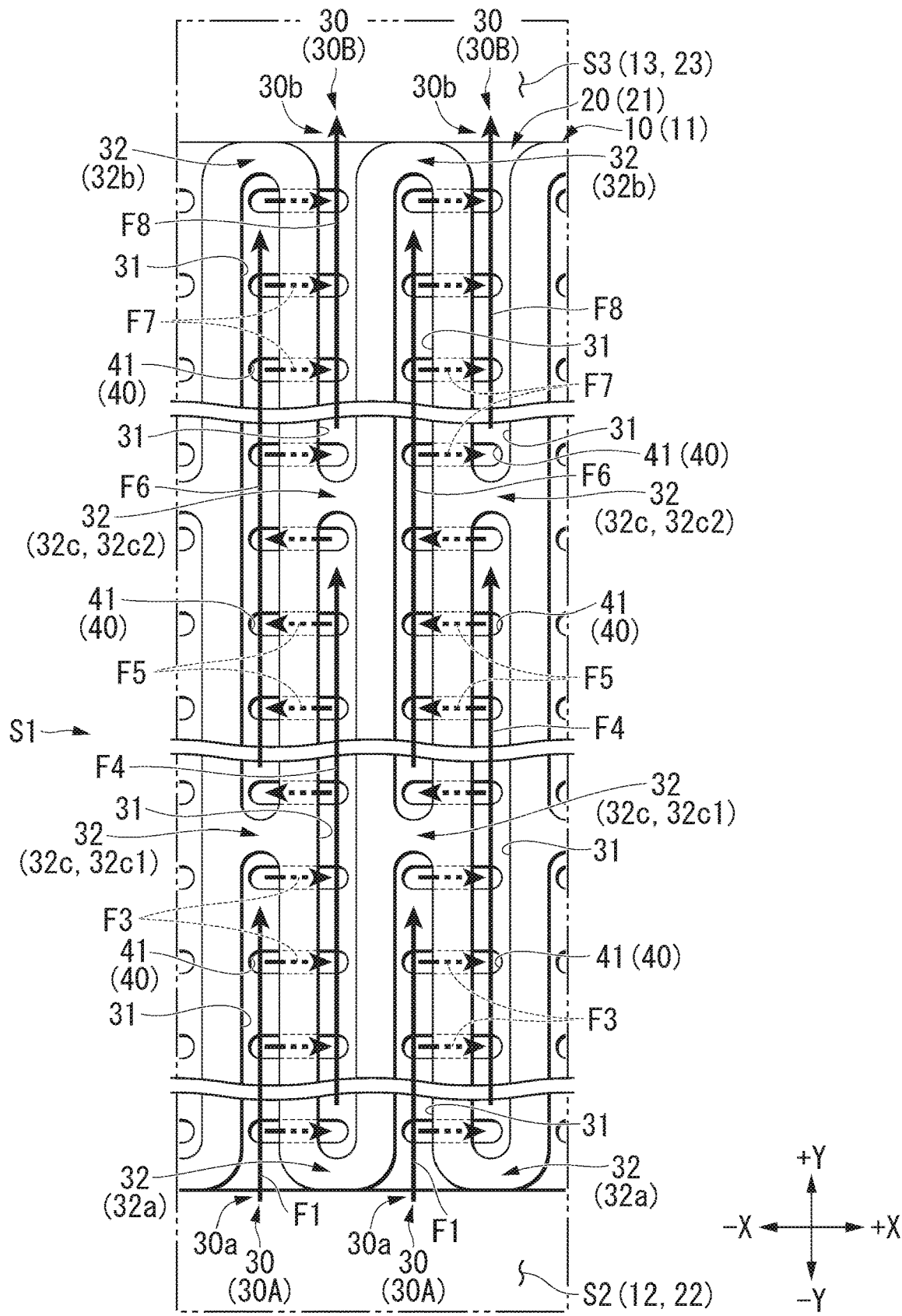
FIG. 6 is a view illustrating a flow of a refrigerant in the first embodiment of the present invention.

As illustrated in FIGS. 5 and 6, each connection hole 41 is disposed to overlap the first flow path 30A and the second flow path 30B in a plan view. More specifically, a left end portion (−X end portion) of the connection hole 41 overlaps the first flow path 30A in a plan view, and a right end portion (+X end portion) of the connection hole 41 overlaps the second flow path 30B in a plan view. Thereby, each connection hole 41 (the cross flow path 40) communicates with the first flow path 30A and the second flow path 30B. Also, the refrigerant is movable between one first flow path 30A and one second flow path 30B that are adjacent to each other in the second direction X through the connection hole 41. Also, as illustrated in FIG. 5, at a portion in which the parallel flow path 30 and the connection hole 41 overlap (a portion in which the parallel flow path 30 and the cross flow path 40 intersect) in a plan view, the refrigerant is movable between all the plates 10 and 20 included in the main body part 1 in the thickness direction Z.

Hereinafter, a flow of the refrigerant in the heat exchange portion S1 (the first heat exchange part 11 and the second heat exchange part 21) in which the parallel flow paths 30 and the cross flow paths 40 as described above are formed will be described on the basis of FIG. 6.

First, the refrigerant that has supplied to the branching portion S2 from the inflow hole 1h1 (see FIG. 2) flows into each of the plurality of first flow paths 30A from the inlet end 30a (illustrated as a flow F1). This is because the inlet blocking portion 32a is provided at the inlet end 30a of the second flow path 30B, and each of connection holes 41 of the cross flow path 40 does not open to the branching portion S2 (branch hole 22). The flowed-in refrigerant flows in the first direction Y through the flow hole 31 of the first flow path 30A, and is blocked by the first intermediate blocking portion 32c1.

As illustrated in FIG. 5, the refrigerant blocked by the first intermediate blocking portion 32c1 moves in the thickness direction Z, and reaches any one of the plurality of cross flow paths 40 (the connection hole 41) formed in the plurality of second plates 20 (illustrated as a flow F2). Then, as illustrated in FIG. 6, the refrigerant moves in the second direction X (rightward) through the connection holes 41 of the cross flow path 40 (illustrated as a flow F3). The refrigerant then reaches any one of the second flow paths 30B formed in the plurality of first plates 10. Specifically, the refrigerant moves to the second flow path 30B through the plurality of connection holes 41 positioned between the inlet end 30a and the first intermediate blocking portion 32c1 in the first direction Y. The refrigerant that has moved to the second flow path 30B flows in the first direction Y through the flow hole 31 of the second flow path 30B, and is blocked by the second intermediate blocking portion 32c2 (illustrated as a flow F4).

The refrigerant blocked by the second intermediate blocking portion 32c2 moves to the first flow path 30A through the connection holes 41 of the cross flow path 40 (illustrated as a flow F5) similarly to the case described above. Specifically, the refrigerant moves to the first flow path 30A through the plurality of connection holes 41 positioned between the first intermediate blocking portion 32c1 and the second intermediate blocking portion 32c2 in the first direction Y. The refrigerant that has moved to the first flow path 30A flows in the first direction Y through the flow hole 31 of the first flow path 30A, and is blocked by the outlet blocking portion 32b (illustrated as a flow F6).

The refrigerant blocked by the outlet blocking portion 32b moves to the second flow path 30B through the connection holes 41 of the cross flow path 40 (illustrated as a flow F7). Specifically, the refrigerant moves to the second flow path 30B through the plurality of connection holes 41 positioned between the second intermediate blocking portion 32c2 and the outlet blocking portion 32b in the first direction Y. The refrigerant that has moved to the second flow path 30B flows in the first direction Y through the flow hole 31 of the second flow path 30B, and flows out from the outlet end 30b to the joining portion S3 (joining hole 13) (illustrated as a flow F8). The refrigerant that has flowed out from each of the plurality of second flow paths 30B joins together at the joining portion S3, and flows to the outside of the main body part 1 from the outflow hole 1h2 (see FIG. 2).

As described above, in the cold plate 100 according to the present embodiment, in the process in which the refrigerant moves in the first direction Y through the heat exchange portion S1, the refrigerant may flow between the first flow path 30A and the second flow path 30B formed in the first plate 10 through the cross flow path 40 formed in the second plate 20. That is, the refrigerant moves not only in the first direction Y but also in the second direction X and the thickness direction Z. Thereby, it is possible to increase a thermal contact area (heat transfer area) between the refrigerant and the main body part 1 compared to a conventional cold plate in which, for example, a plurality of fins are arranged parallel to each other and a refrigerant flows only in one direction. Also, since the first heat exchange part 11 and the second heat exchange part 21 are formed in a thin layer shape (for example, about 0.2 mm), a temperature boundary layer is made thin, and it is possible to improve a heat transfer efficiency between the refrigerant and the main body part 1. Therefore, it is possible to improve a cooling efficiency of the cold plate 100.

Note that, the reason why the refrigerant flows in a meandering manner between the first flow path 30A and the second flow path 30B as described above is because the second intermediate blocking portion 32c2 is positioned on the outlet side with respect to the first intermediate blocking portion 32c1 (see FIG. 6). In other words, this is because, the second intermediate blocking portion 32c2 is positioned between the first intermediate blocking portion 32c1 and the outlet blocking portion 32b in the first direction Y. Thereby, the blocking portions 32 are alternately disposed with respect to the first flow path 30A and the second flow path 30B in a direction from the inlet side toward the outlet side such as the inlet blocking portion 32a disposed in the second flow path 30B, the first intermediate blocking portion 32c1 disposed in the first flow path 30A, the second intermediate blocking portion 32c2 disposed in the second flow path 30B, and the outlet blocking portion 32b disposed in the first flow path 30A. In other words, a flow path set of one first flow path 30A and one second flow path 30B may include a plurality (four in the present embodiment) of blocking portions 32, and the plurality of blocking portions 32 are disposed alternately in the first flow path 30A and the second flow path 30B in the flow path set when viewed in the first direction Y. Thereby, the meandering of the refrigerant as described above is realized.

Also, as illustrated in FIG. 6, in the heat exchange portion S1 according to the present embodiment, each connection hole 41 (cross flow path 40) may be disposed so that at least one connection hole 41 (cross flow path 40) may open (communicate) in the vicinity of each blocking portion 32 (for example, the outlet blocking portion 32b). More specifically, the connection hole 41 (the cross flow path 40) opens (communicates) at a portion (space) of the first flow path 30A adjacent to the blocking portion 32 (the outlet blocking portion 32b and the first intermediate blocking portion 32c1) in the first direction Y. Also, the connection hole 41 (the cross flow path 40) opens (communicates) at a portion (space) of the second flow path 30B adjacent to the blocking portion 32 (the second intermediate blocking portion 32c2 and the inlet blocking portion 32a) in the first direction Y. Thereby, it is possible to suppress retention of the refrigerant in the vicinity of the blocking portion 32. In other words, it is possible to promote movement of the refrigerant between the first flow path 30A and the second flow path 30B. Note that, "being in the vicinity of the blocking portion 32" and "being adjacent to the blocking portion 32" mean that the blocking portion 32 and the connection hole 41 (the cross flow path 40) are close to each other to an extent that it is possible to suppress retention of the refrigerant in the vicinity of the blocking portion 32.

Note that, the intermediate blocking portion 32c may not be provided in the parallel flow path 30. In this case, it is sufficient that the second heat exchange part 21 has at least one cross flow path 40 that communicates with the first flow path 30A and the second flow path 30B. Even with such a configuration, it is possible to cause the refrigerant to move in the second direction X between the first flow path 30A and the second flow path 30B through the cross flow path 40.

Also, the outlet blocking portion 32b may not be provided in the first flow path 30A, and the inlet blocking portion 32a may not be provided in the second flow path 30B. Even in this case, it is thought that at least some of the refrigerant moves between the first flow path 30A and the second flow path 30B through the cross flow path 40. However, a configuration in which the outlet blocking portion 32b is provided in the first flow path 30A may yield movement of the refrigerant from the first flow path 30A toward the second flow path 30B always occurs, and it is possible to increase the thermal contact area between the refrigerant and the main body part 1 more reliably.

Also, it is sufficient that the main body part 1 includes at least one layer of the first plate 10 (the first heat exchange part 11) and at least one layer of the second plate 20 (the second heat exchange part 21). Even in this case, it is possible to increase the thermal contact area by causing the refrigerant to move between the first flow path 30A and the second flow path 30B through the cross flow path 40.

As described above, the cold plate 100 according to the present embodiment may include the main body part 1 in contact with the heat source, in which the main body part 1 has the inflow hole 1h1 through which the refrigerant flows in, the outflow hole 1h2 through which the refrigerant flows out, the internal space S communicating with the inflow hole 1h1 and the outflow hole 1h2 and through which the refrigerant flows, and the layer-shaped first heat exchange part 11 and the second heat exchange part 21 disposed in the internal space S and laminated in the thickness direction Z, the first heat exchange part 11 has the first flow path 30A through which the refrigerant flows in the first direction Y, and the second flow path 30B through which the refrigerant flows in the first direction Y and disposed at a position different from the first flow path 30A in the second direction X intersecting the first direction Y, and the second heat exchange part 21 includes the cross flow path 40 disposed in the internal space S and communicating with the first flow path 30A and the second flow path 30B so that the refrigerant flows therethrough in the second direction X.

According to this configuration, in the process in which the refrigerant flows from the inflow hole 1h1 to the outflow hole 1h2, the refrigerant moves between the first flow path 30A and the second flow path 30B formed in the first heat exchange part 11 through the cross flow path 40 formed in the second heat exchange part 21. Thereby, it is possible to increase a thermal contact area (heat transfer area) between the refrigerant and the main body part 1 compared to a conventional cold plate in which, for example, a plurality of fins are arranged parallel to each other and a flow path extends linearly. Therefore, it is possible to improve the cooling efficiency of the cold plate 100. Also, since the first heat exchange part 11 and the second heat exchange part 21 are formed in a thin layer shape (for example, about 0.2 mm), a temperature boundary layer is made thin, and it is also possible to improve a heat transfer efficiency between the refrigerant and the main body part 1.

Also, the second heat exchange part 21 has the plurality of cross flow paths 40 whose positions in the first direction Y are different from each other. With this configuration, movement of the refrigerant between the first flow path 30A and the second flow path 30B is promoted, and it is possible to further improve the cooling efficiency of the cold plate 100 compared to a case in which, for example, the second heat exchange part 21 has only one cross flow path 40.

Also, the outlet blocking portion 32b restricting a flow of the refrigerant in the first direction Y is provided at the end portion (the outlet end 30b) of both end portions of the first flow path 30A close to the outflow hole 1h2 in the first direction Y. With this configuration, movement of the refrigerant from the first flow path 30A toward the second flow path 30B always occurs, and it is possible to improve the cooling efficiency of the cold plate 100.

Also, the cross flow path 40 communicates with a portion of the first flow path 30A adjacent to the outlet blocking portion 32b. That is, the cross flow path 40 communicates with the first flow path 30A in the vicinity of the outlet blocking portion 32b. With this configuration, it is possible to suppress retention of the refrigerant in the vicinity of the outlet blocking portion 32b. Note that, in the above-described embodiment, for all the blocking portions 32 provided in the parallel flow paths 30, the cross flow paths 40 may be provided in the vicinity thereof. With this configuration, for all the blocking portions 32 provided in the parallel flow paths 30, it is possible to suppress retention of the refrigerant in the vicinity thereof.

Also, the second heat exchange part 21 includes the plurality of cross flow paths 40 having different positions from each other in the first direction Y, the first intermediate blocking portion 32c1 restricting a flow of the refrigerant in the first direction Y is provided at a portion of the first flow path 30A other than both end portions (the inlet end 30a and the outlet end 30b) in the first direction Y, the second intermediate blocking portion 32c2 restricting a flow of the refrigerant in the first direction Y is provided at a portion of the second flow path 30B other than both end portions (the inlet end 30a and the outlet end 30b) in the first direction Y, and the second intermediate blocking portion 32c2 is positioned between the outlet blocking portion 32b and the first intermediate blocking portion 32c1 in the first direction Y. With this configuration, it is possible to increase a rigidity of the first heat exchange part 11 compared to a case in which, for example, the intermediate blocking portions 32c1 and 32c2 are not provided in the parallel flow path 30. Also, the blocking portions 32 are alternately disposed for the first flow path 30A and the second flow path 30B in a direction from the inlet side toward the outlet side, and thereby the intermediate blocking portion 32c is less likely to hinder a flow of the refrigerant.

Also, the inlet blocking portion 32a restricting a flow of the refrigerant in the first direction Y is provided at the end portion (the inlet end 30a) of both end portions of the second flow path 30B close to the inflow hole 1h1 in the first direction Y. For example, in the example illustrated in FIG. 6, if the inlet blocking portion 32a is not provided in the second flow path 30B, the refrigerant that has been supplied to the branching portion S2 may flow into both the first flow path 30A and the second flow path 30B. Here, due to the presence of the first intermediate blocking portion 32c1, resistance generated in the refrigerant in the first flow path 30A is larger than resistance generated in the refrigerant in the second flow path 30B. Due to such a difference in flow path resistance, most of the refrigerant that has been supplied to the branching portion S2 does not flow into the first flow path 30A but flows only into the second flow path 30B. As a result, the flows F1 and F3 illustrated in FIG. 6 do not easily occur. When the inlet blocking portion 32a is provided in the second flow path 30B, it is possible to prevent occurrence of the effects caused by the difference in flow path resistance as described above.

Also, the main body part 1 includes the plurality of first heat exchange parts 11 and the plurality of second heat exchange parts 21 which are alternately laminated in the thickness direction Z. With this configuration, it is possible to improve a cooling efficiency of the main body part 1 compared to a case in which, for example, the main body part 1 includes only one first heat exchange part 11 and only one second heat exchange part 21.

Second Embodiment

Next, a second embodiment will be described, but a basic configuration is the same as that of the first embodiment. Therefore, components which are the same are denoted by the same reference signs, description thereof will be omitted, and only different points will be described. In the present embodiment, a structure of a first heat exchange part 11A may be different from the structure of the first heat exchange part 11 in the first embodiment.

Figure 7:
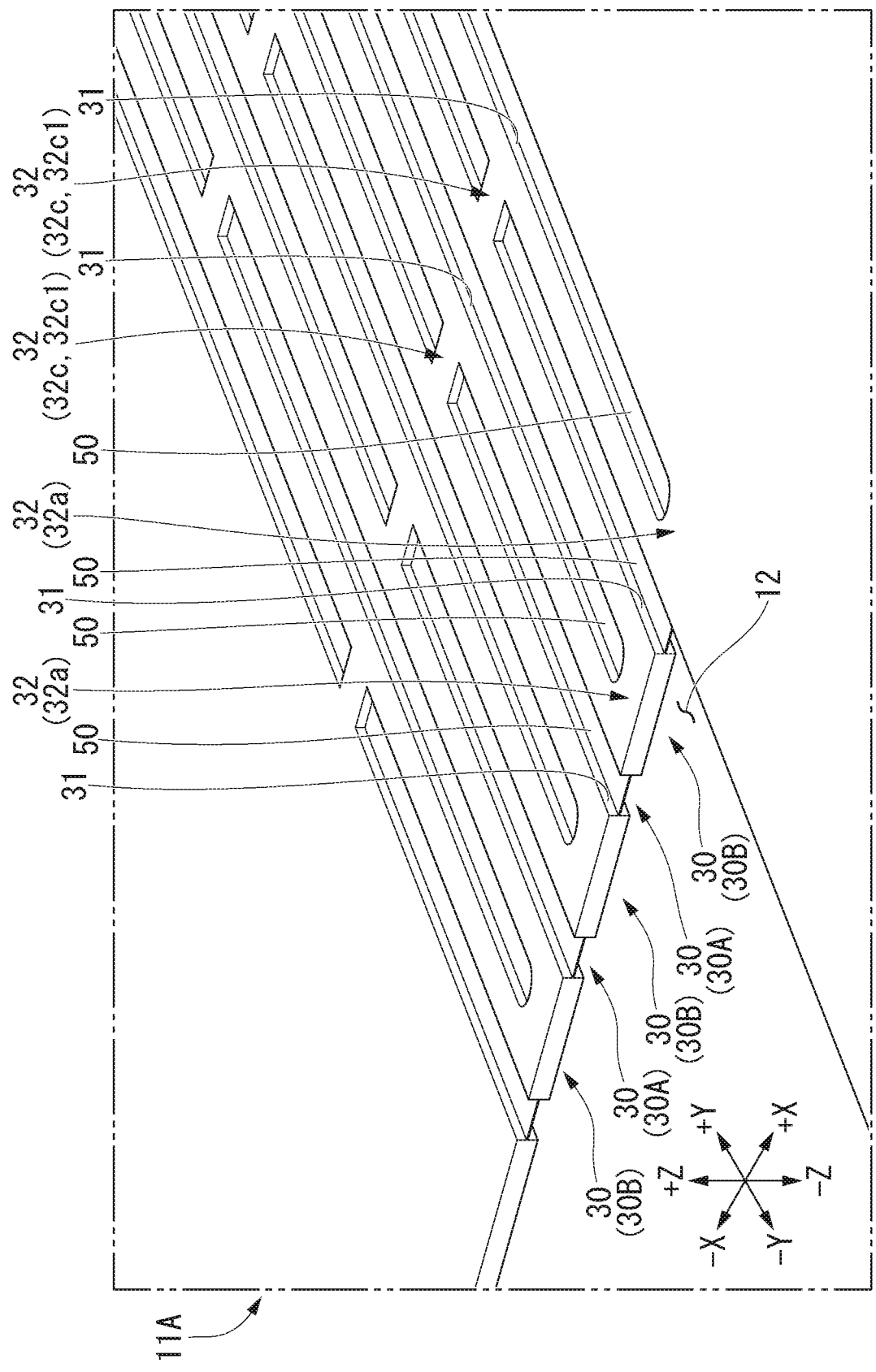
FIG. 7 is a perspective view illustrating a first plate according to a second embodiment of the present invention.

As illustrated in FIG. 7, in the first heat exchange part 11A according to the present embodiment, a restriction portion 50 may be provided in a flow hole 31, and the flow hole 31 may not penetrate the first heat exchange part 11A in a thickness direction Z. The restriction portion 50 according to the present embodiment may have a film-like shape extending in a second direction X and a first direction Y. Also, a thickness of the restriction portion 50 is smaller than a thickness of the first heat exchange part 11, and the restriction portion 50 is positioned at a central portion of the flow hole 31 in the thickness direction Z. Note that, the first heat exchange part 11A having such a restriction portion 50 may be manufactured by, for example, subjecting a layer-shaped member to half-etching processing for a portion to be the flow hole 31.

Figure 8:
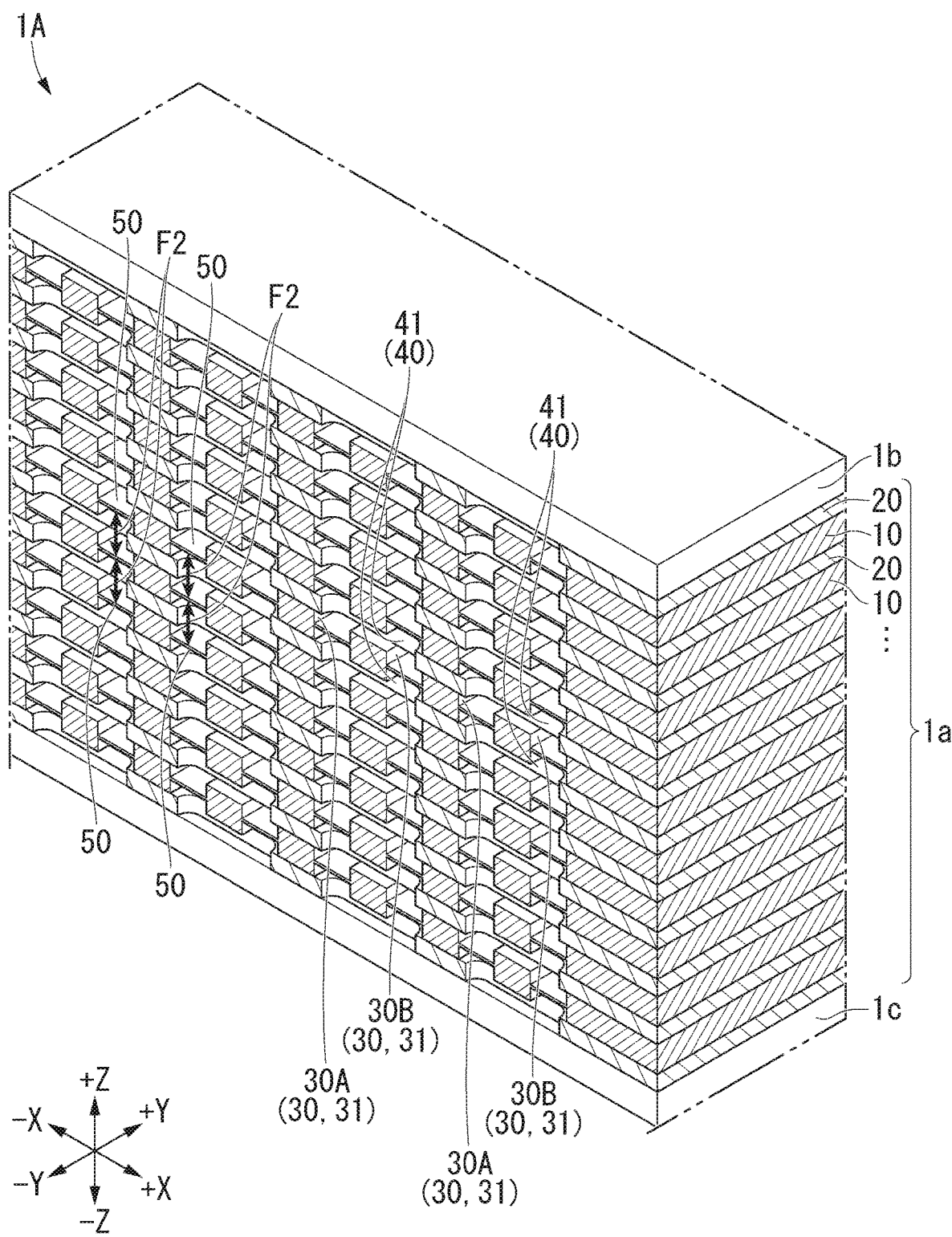
FIG. 8 is a perspective view illustrating a cross section of a cold plate according to the second embodiment of the present invention.

When the first heat exchange part 11A includes the restriction portion 50, a flow F2 of a refrigerant in the thickness direction Z is restricted as illustrated in FIG. 8. More specifically, at a portion in which a parallel flow path 30 and a connection hole 41 overlap (a portion in which the parallel flow path 30 and a cross flow path 40 intersect) in a plan view, a range in which the refrigerant is movable in the thickness direction Z is restricted. In the example illustrated in FIG. 8, each parallel flow path 30 communicates only with the cross flow path 40 (connection hole 41) adjacent to the parallel flow path 30 in the thickness direction Z. That is, the refrigerant flowing through the parallel flow path 30 moves between a first flow path 30A and a second flow path 30B only through the connection hole 41 adjacent to the parallel flow path 30 in the thickness direction Z. Thereby, it is possible to make an amount of the refrigerant flowing through each cross flow path 40 (connection hole 41) nearly uniform.

As described above, a main body part 1A according to the present embodiment may further include the restriction portion 50 restricting a range in which the refrigerant is movable in the thickness direction Z at a portion in which the first flow path 30A and the second flow path 30B intersect the cross flow path 40 when viewed from the thickness direction Z. With this configuration, it is possible to reduce variation in an amount of the refrigerant flowing through each cross flow path 40, and to further improve the cooling efficiency of the cold plate 100.

Note that, the technical scope of the present invention is not limited to the above-described embodiments, and various modifications may be made within a range not departing from the meaning of the present invention.

For example, the restriction portion 50 in the second embodiment may be provided in the second heat exchange part 21 instead of the first heat exchange part 11A. Specifically, the film-like restriction portion 50 may be provided in the connection hole 41 of the cross flow path 40. The second heat exchange part 21 having such a restriction portion 50 may be manufactured by, for example, subjecting a layer-shaped member to half-etching processing for a portion to be the connection hole 41. Alternatively, a film-like member may be inserted between the first heat exchange part 11A and the second heat exchange part 21 to cause the member to assume a function of the restriction portion 50.

Also, the number of the intermediate blocking portions 32c provided in the parallel flow path 30 may be changed as appropriate. Also in this case, in each flow path set, when the plurality of blocking portions 32 are disposed alternately in the first flow path 30A and the second flow path 30B as viewed in the first direction Y, it is possible to obtain the same effects as those of the above-described embodiments. Depending on the number and disposition of the intermediate blocking portions 32c, a configuration in which both an inlet blocking portion 32a and an outlet blocking portion 32b are provided in the first flow path 30A may be realized. Similarly, a configuration in which both the inlet blocking portion 32a and the outlet blocking portion 32b are provided in the second flow path 30B may be realized.

Also, in the example illustrated in FIG. 3 or the like, the plurality of parallel flow paths 30 have been disposed at regular intervals in the second direction X, but the intervals between the parallel flow paths 30 may not be regular. Similarly, intervals between the cross flow paths 40 may not be regular.

Also, in the embodiments described above, each connection hole 41 has communicated with one first flow path 30A and one second flow path 30B to serve the role of connecting these two flow paths 30A and 30B in the second direction X, but a configuration of the connection hole 41 is not limited thereto. For example, each connection hole 41 may extend in the second direction X to communicate with three or more parallel flow paths 30. Also, the non-connection portion 42 may not be provided in the cross flow path 40, and one connection hole 41 may communicate with all the parallel flow paths 30.

Also, in the embodiments described above, the first heat exchange part 11 and the second heat exchange part 21 have been portions of the first plate 10 and the second plate 20 which constitute the main body part 1, but a configuration of the first heat exchange part 11 and the second heat exchange part 21 is not limited thereto. For example, the main body part 1 may have a box shape, and the heat exchange portion S1 having the first heat exchange part 11 and the second heat exchange part 21 may be housed inside the box-shaped main body part 1. Alternatively, the main body part 1 may have a configuration including a plate-shaped main body member and a topped cylindrical cover member attached to the main body member. Then, the heat exchange portion S1 may be housed in the internal space S surrounded by the main body member and the cover member.

Further, as long as it is possible to supply the refrigerant from the inflow hole 1h1 and to discharge the refrigerant from the outflow hole 1h2, the cold plate 100 may not include the inlet connection part 2 and the outlet connection part 3.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

100 Cold plate
1, 1A Main body part
1h1 Inflow hole
1h2 Outflow hole
11, 11A First heat exchange part
21 Second heat exchange part
30A First flow path
30B Second flow path
32a Inlet blocking portion
32b Outlet blocking portion
32c1 First intermediate blocking portion
32c2 Second intermediate blocking portion
40 Cross flow path
S Internal space
Y First direction
X Second direction
Z Thickness direction

What is claimed is:

1. A cold plate comprising:
a main body in contact with a heat source, wherein the main body:
has:
an inflow hole through which a refrigerant flows in;
an outflow hole through which the refrigerant flows out; and
an internal space communicating with the inflow hole and the outflow hole and through which the refrigerant flows; and
comprises:
a first heat exchange layer in the internal space; and
a second heat exchange layer in the internal space,
the first heat exchange layer and the second heat exchange layer are laminated in a thickness direction of the first heat exchange layer and of the second heat exchange layer,
the first heat exchange layer has:
a first flow path through which the refrigerant flows in a first direction; and
a second flow path through which the refrigerant flows in the first direction and disposed at a position different from the first flow path in a second direction intersecting the first direction, and
the second heat exchange layer has:
a cross flow path in the internal space that communicates with the first flow path and the second flow path such that the refrigerant flows therethrough in the second direction.

2. The cold plate according to claim 1, wherein
the second heat exchange layer further has cross flow paths in the internal space that communicate with the first flow path and the second flow path such that the refrigerant flows therethrough in the second direction, and
the cross flow paths are disposed at different positions from each other in the first direction.

3. The cold plate according to claim 1, further comprising an outlet blocking portion restricting a flow of the refrigerant in the first direction at an end of the first flow path close to the outflow hole in the first direction.

4. The cold plate according to claim 3, wherein the cross flow path communicates with a portion of the first flow path adjacent to the outlet blocking portion.

5. The cold plate according to claim 3, wherein
the second heat exchange layer further has cross flow paths in the internal space that communicate with the first flow path and the second flow path such that the refrigerant flows therethrough in the second direction,
the cross flow paths are disposed at different positions from each other in the first direction,
the cold plate further comprises:
a first intermediate blocking portion restricting a flow of the refrigerant in the first direction at a portion of the first flow path other than ends of the first flow path in the first direction; and
a second intermediate blocking portion restricting a flow of the refrigerant in the first direction at a portion of the second flow path other than ends of the second flow path in the first direction, and the second intermediate blocking portion is disposed between the outlet blocking portion and the first intermediate blocking portion in the first direction.

6. The cold plate according to claim 3, further comprising an inlet blocking portion restricting a flow of the refrigerant in the first direction at an end of the second flow path close to the inflow hole in the first direction.

7. The cold plate according to claim 1, wherein the main body comprises:
   first heat exchange layers in the internal space; and
   second heat exchange layers in the internal space, wherein
   the first heat exchange layers and the second heat exchange layers are alternately laminated in the thickness direction,
   each of the first heat exchange layers has:
      a first flow path through which the refrigerant flows in a first direction; and
      a second flow path through which the refrigerant flows in the first direction and disposed at a position different from the first flow path in a second direction intersecting the first direction, and
   each of the second heat exchange layers has:
      a cross flow path in the internal space that communicates with the first flow path and the second flow path such that the refrigerant flows therethrough in the second direction.

8. The cold plate according to claim 7, further comprising a restriction portion restricting a range in which the refrigerant moves in the thickness direction at a portion in which the first flow path and the second flow path intersect the cross flow path when viewed in the thickness direction.

\* \* \* \* \*